(12) United States Patent
Schmitt et al.

(10) Patent No.: US 11,851,266 B2
(45) Date of Patent: Dec. 26, 2023

(54) A-FRAME RACK SYSTEMS FOR TRANSPORTING GLASS SHEETS

(71) Applicant: Trulite Glass & Aluminum Solutions, LLC, Peachtree City, GA (US)

(72) Inventors: John Schmitt, Peachtree City, GA (US); Robert Carlson, Decatur, IL (US); Mike Walker, Fort Madison, IA (US); Brock Walker, Fort Madison, IA (US); Bill Coppage, Fort Madison, IA (US)

(73) Assignee: TRULITE GLASS & ALUMINUM SOLUTIONS LLC, Peachtree City, GA (US)

( * ) Notice: Subject to any disclaimer, the term of this patent is extended or adjusted under 35 U.S.C. 154(b) by 0 days.

(21) Appl. No.: 17/898,456

(22) Filed: Aug. 29, 2022

(65) Prior Publication Data
US 2023/0062871 A1   Mar. 2, 2023

Related U.S. Application Data

(60) Provisional application No. 63/238,105, filed on Aug. 27, 2021.

(51) Int. Cl.
*B65D 85/48* (2006.01)
*B65D 19/00* (2006.01)
*B65G 1/04* (2006.01)

(52) U.S. Cl.
CPC ......... *B65D 85/48* (2013.01); *B65D 19/0002* (2013.01); *B65G 1/04* (2013.01)

(58) Field of Classification Search
CPC .......... B62B 3/006; B62B 3/10; B62B 3/108; B65G 1/0407; B65G 1/0435;
(Continued)

(56) References Cited

U.S. PATENT DOCUMENTS

| 2,803,362 | A | * | 8/1957 | Saenz | ...................... B60P 3/07 |
| | | | | | 280/490.1 |
| 3,805,981 | A | * | 4/1974 | Christensen | ........... B62D 13/00 |
| | | | | | 414/697 |

(Continued)

FOREIGN PATENT DOCUMENTS

JP   2018076147 A   *   5/2018

*Primary Examiner* — Hiwot E Tefera
(74) *Attorney, Agent, or Firm* — Porter Wright Morris & Arthur LLP

(57) ABSTRACT

A rack system movable by a forklift having blades that can be selectively raised and lowered. The rack system includes a rack and a hitch device for connecting the forklift to the rack. The rack includes a structure configured for supporting and transporting materials, at least one wheel located at a first end of the structure, and a hitch bracket located at a second end of the structure. The hitch device includes a body configured to be carried by the blades of the forklift, and an arm pivotably secured to the body, and an engagement member at the second end of the arm. Upward movement of the blades raises the engagement member into engagement with the hitch bracket so that further upward movement of the blades raises the second end of the rack and horizontal movement of the forklift rolls the rack on the at least one wheel.

10 Claims, 16 Drawing Sheets

(58) Field of Classification Search
CPC ........ B65G 1/0421; B65G 49/06; B65G 1/04;
B65G 49/062; B65D 19/0002; B65D
85/48; B65D 2519/00024; B65D
2519/00059; B65D 2519/00273; B65D
2519/00293; B65D 2519/00323; B65D
2519/00333; B65D 2519/00781; B65D
2519/0081; B65D 19/42; B65D 19/44;
B60P 3/002
USPC ............................................ 280/79.3, 43.12
See application file for complete search history.

(56) References Cited

U.S. PATENT DOCUMENTS

| | | | |
|---|---|---|---|
| 4,266,678 A | 5/1981 | Daly | |
| 4,934,538 A | 6/1990 | Beyer | |
| 5,085,329 A * | 2/1992 | Crowell | B65D 85/62 |
| | | | 211/195 |
| 5,411,360 A | 5/1995 | Hilliker et al. | |
| 5,727,805 A * | 3/1998 | La Roque | B60D 1/155 |
| | | | 280/491.2 |
| 5,755,339 A * | 5/1998 | Belanger | B65G 49/062 |
| | | | 211/41.14 |
| 5,984,341 A * | 11/1999 | Kass | B60D 1/46 |
| | | | 280/406.1 |
| 6,123,208 A * | 9/2000 | Haenszel | B65D 85/68 |
| | | | 211/208 |
| 6,536,607 B1 | 3/2003 | Knoll et al. | |
| 6,722,380 B1 * | 4/2004 | Hafer | B60R 9/06 |
| | | | 280/491.5 |
| 6,820,752 B2 | 11/2004 | Jerskey et al. | |
| 6,910,591 B2 | 6/2005 | Knoll et al. | |
| 7,958,999 B2 | 6/2011 | Noda et al. | |
| 8,376,291 B1 | 2/2013 | Groves | |
| 8,789,710 B1 * | 7/2014 | Moore | B62B 1/20 |
| | | | 211/41.14 |
| D713,322 S | 9/2014 | Moore et al. | |
| 9,463,937 B2 | 10/2016 | Piccininno et al. | |
| 10,106,294 B2 * | 10/2018 | Böttcher | A47B 47/0075 |
| 11,713,161 B2 * | 8/2023 | Servaes | B65D 85/48 |
| | | | 211/41.1 |
| 2005/0218617 A1 * | 10/2005 | Frahm | B62B 3/002 |
| | | | 280/79.3 |
| 2011/0097186 A1 * | 4/2011 | Gibson | B65D 85/48 |
| | | | 414/800 |
| 2015/0158410 A1 * | 6/2015 | Belmont | B60P 3/002 |
| | | | 410/2 |
| 2020/0094863 A1 * | 3/2020 | Parrish | B60D 1/52 |
| 2020/0247198 A1 * | 8/2020 | Wernberg | B60D 1/54 |
| 2020/0361508 A1 * | 11/2020 | Winden | B62B 1/12 |
| 2021/0053772 A1 * | 2/2021 | English | B60P 3/002 |
| 2021/0229720 A1 * | 7/2021 | Burns | B62B 5/00 |
| 2021/0253153 A1 * | 8/2021 | Mallette | B62K 11/10 |

* cited by examiner

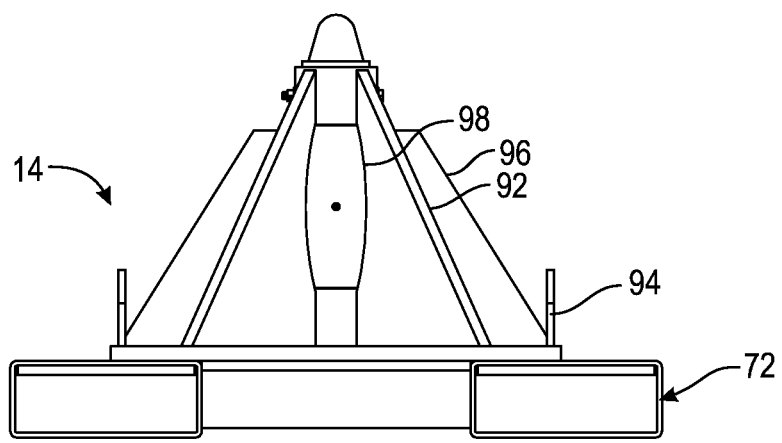
FIG. 12
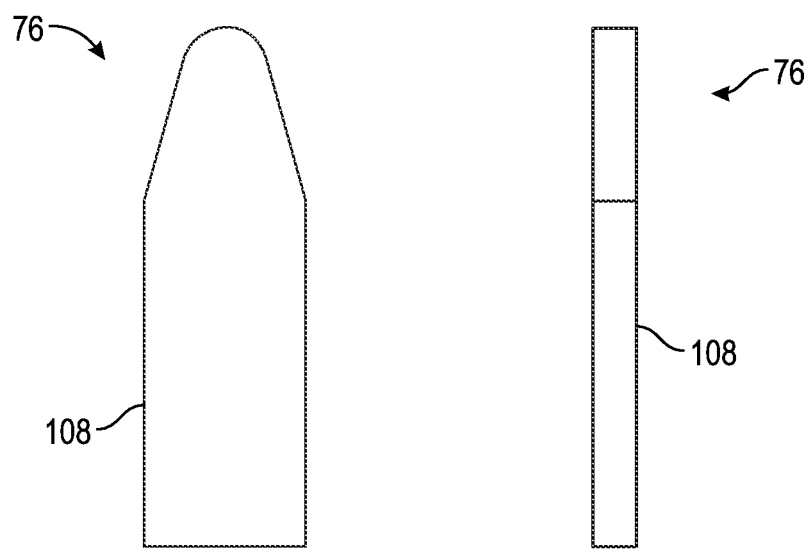
FIG. 13   FIG. 14

A-FRAME RACK SYSTEMS FOR TRANSPORTING GLASS SHEETS

CROSS-REFERENCE TO RELATED APPLICATIONS

This application claims priority benefit of U.S. Provisional Patent Application No. 63/238,105 filed on Aug. 27, 2021, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to racks for transporting sheet materials such as glass, and more particularly, to such transportable racks that are carried by semi-trailers.

BACKGROUND OF THE INVENTION

Sheet material such as, for example but not limited to, glass are typically transported and stored in a substantially upright and inclined position on a rack. An A-frame rack typically includes two or more A-frames, which take the form of a tall, often truncated, isosceles triangle. The A-frame rack also includes a support at the base upon which the sheets are stood on edge and then leaned against the A-frames for support. The sheets are typically held in place by gravity during storage but straps or other securing mechanisms are used to hold the sheets in place when the loaded A-frame racks are transported.

A-frame racks are often intended for both storing sheets of glass and transporting sheets of glass. When used for shipping, A-frame racks are typically designed as reusable structures that are shipped loaded with glass sheets and returned empty. In an effort to minimize shipping costs on the return trip, A-frames have been designed to minimize shipping costs by making them such that a greater number of racks can be on a return trip than on an initial shipping trip.

U.S. Pat. No. 9,463,937, the disclosure of which is expressly incorporated herein in its entirety by reference, discloses racks for transporting glass panels that are collapsible so that more racks can be returned in a single return trip. U.S. Pat. No. 8,376,291, the disclosure of which is expressly incorporated herein in its entirety by reference, discloses racks for transporting glass panels that are foldable so that more racks can be returned in a single return trip. U.S. Pat. Nos. 6,910,591 and 6,536,607, the disclosures of which are expressly incorporated herein in their entireties by reference, discloses racks for transporting glass panels have a retractable beam (either telescopic or folding). With the beam retracted, the racks can be transported laterally and side-by-side on a semi-trailer. U.S. Pat. No. 6,820,752, the disclosure of which is expressly incorporated herein in its entirety by reference, discloses racks for transporting glass panels that are foldable and stackable so that more racks can be returned in a single return trip.

These rack systems have successfully increased the number of racks that can be returned in a single return trip. However, these prior collapsing folding and/or otherwise reconfiguring racks can have reduced lives and/or increased repair costs and also can have lower than desired maximum load restrictions. These prior collapsing folding and/or otherwise reconfiguring racks additionally require time and labor to reconfigure the racks between product supporting and empty return configurations. Accordingly, there continues to be a need for improved rack systems for transporting glass sheets.

SUMMARY OF THE INVENTION

The present invention provides rack systems, devices, and methods which address at least one of the above-noted problems of the prior art. Disclosed herein is a rack system movable by a forklift having a pair of blades that can be selectively raised and lowered. The rack system comprises, in combination, a rack and a hitch device. The rack comprises a structure configured for supporting and transporting materials and having a first end and a second end opposite the first end, at least one wheel located at the first end of the structure, and a hitch bracket located at the second end of the structure. The hitch device comprises, a body configured to be carried by the blades of the forklift, an arm having a first end and a second end, wherein the first end of the arm is pivotably secured to the body for pivoting movement of the arm relative to the body about a vertical axis, and an engagement member at the second end of the arm. The engagement member and the hitch bracket are configured so that upward movement of the blades raises the engagement member into engagement with the hitch bracket so that further upward movement of the blades raises the second end of the rack and horizontal movement of the forklift rolls the rack on the at least one wheel.

Also disclosed herein is a rack for transporting glass sheets. The rack comprises, in combination, a structure comprising a pair of laterally spaced apart support frames configured to support the glass sheets, at least one wheel at a first end of the structure, and a hitch bracket at a second end of the structure opposite the first end. The hitch bracket includes a vertically-extending passage open at a lower end and a pair of laterally spaced-apart slots open at lower ends.

Also disclosed herein is a hitch device for moving a rack with a forklift having a pair of blades that can be selectively raised and lowered The hitch device comprises, in combination, a body configured to be carried by the blades of the forklift, an arm having a first end and a second end, wherein the first end of the arm is pivotably secured to the body for pivoting movement of the arm relative to the body about a vertical axis and an engagement member carried by the arm at the second end of the arm.

From the foregoing disclosure and the following more detailed description of various preferred embodiments it will be apparent to those skilled in the art that the present invention provides a significant advance in the technology and art of rack systems for transporting sheet materials Particularly, significant in this regard is the potential the invention affords for providing a reliable and effective rack system that strong, reliable and that does not need to be reconfigured between a storing configuration and a return configuration in order to maximize the quantity of racks for return loads on a single semi-trailer. Additional features and advantages of the invention will be better understood in view of the detailed description provided below.

BRIEF DESCRIPTION OF THE DRAWINGS

These and further objects of the invention will become apparent from the following detailed description.

FIG. 12 is a rear elevational view of the hitch device of FIGS. 8 to 11.

FIG. 13 is a front view of an engagement member of the hitch device of FIGS. 8 to 12.

FIG. 14 is a left side view of the engagement member of FIG. 13.

Figure 1:
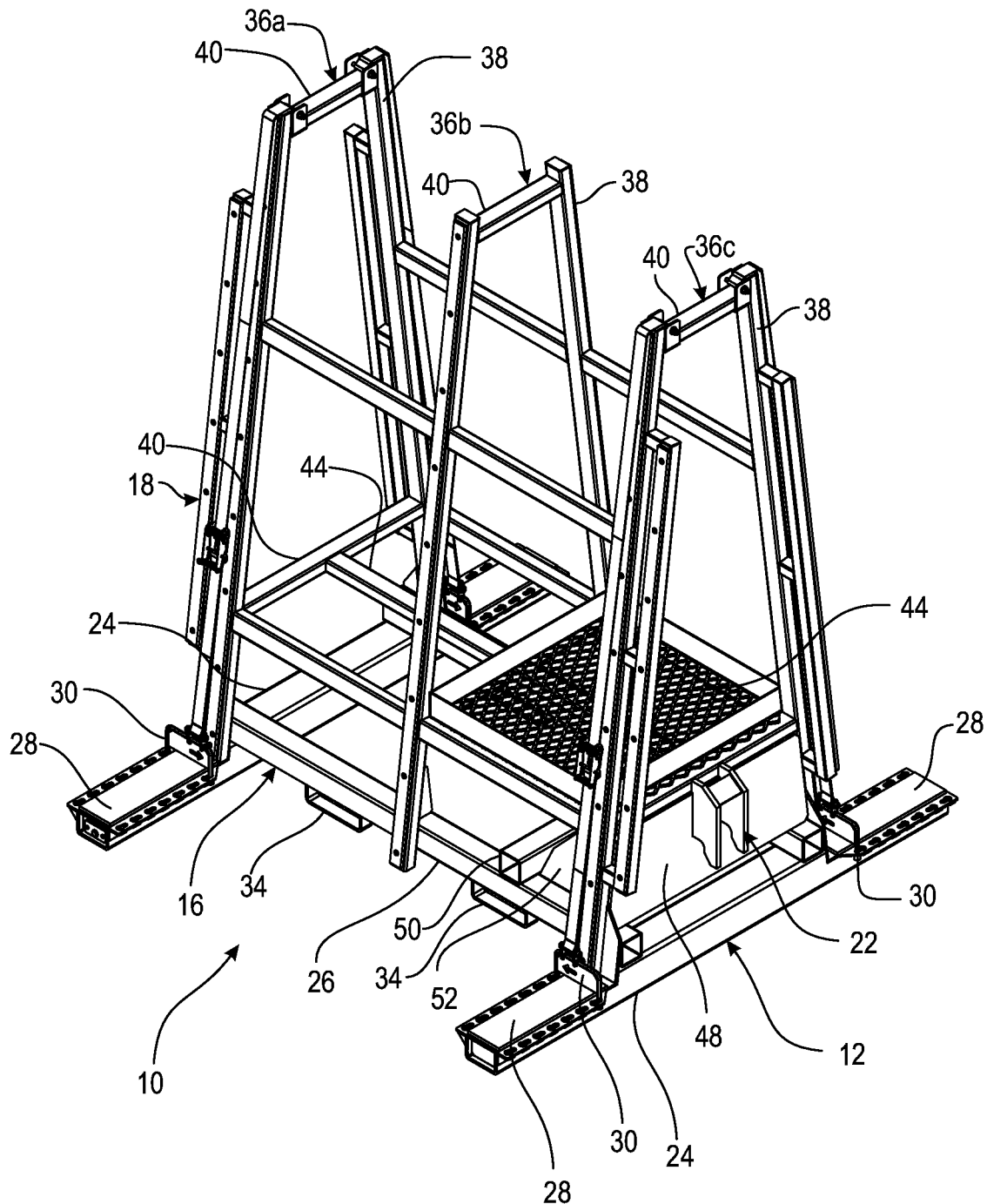
FIG. 1 is a perspective view of an A-frame rack for transporting glass sheets according to the present invention.
Figure 2:
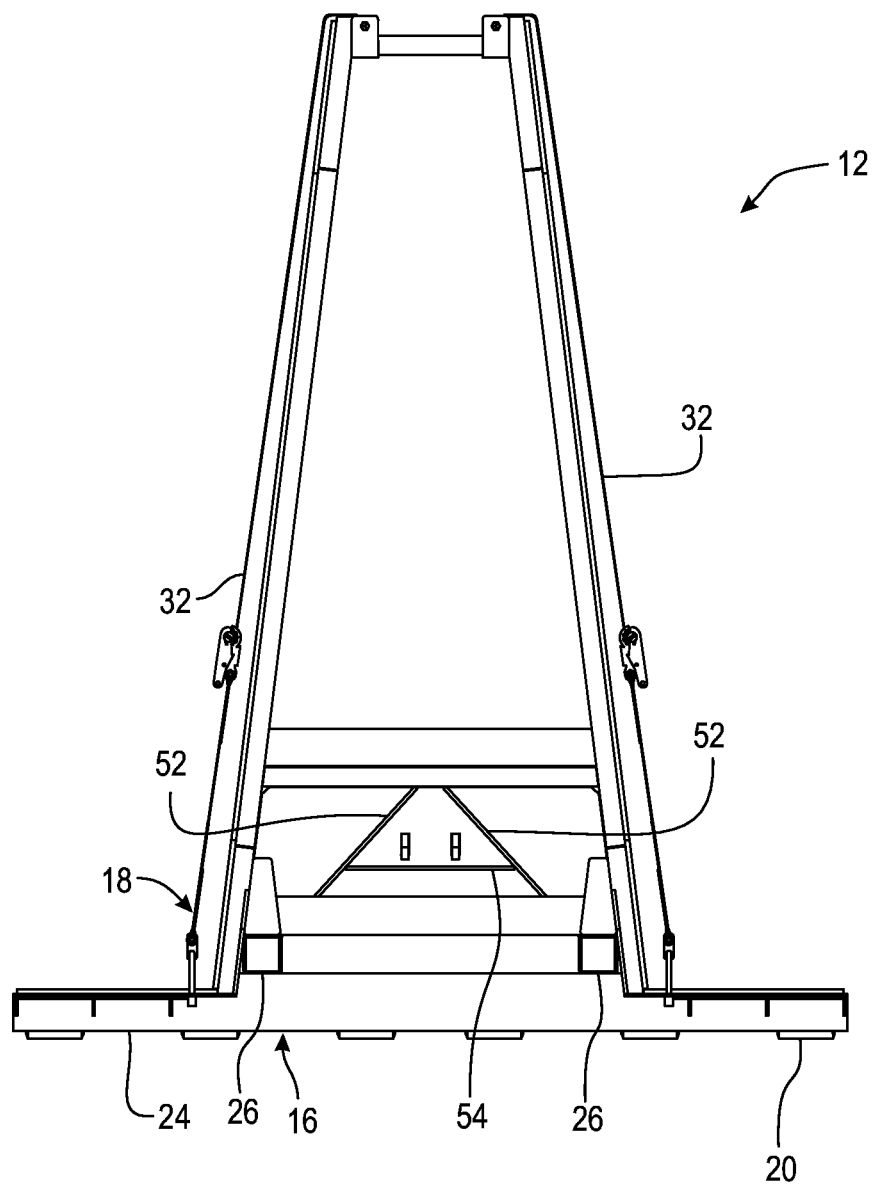
FIG. 2 is a front elevational view of the A-frame rack of FIG. 1.
Figure 3:
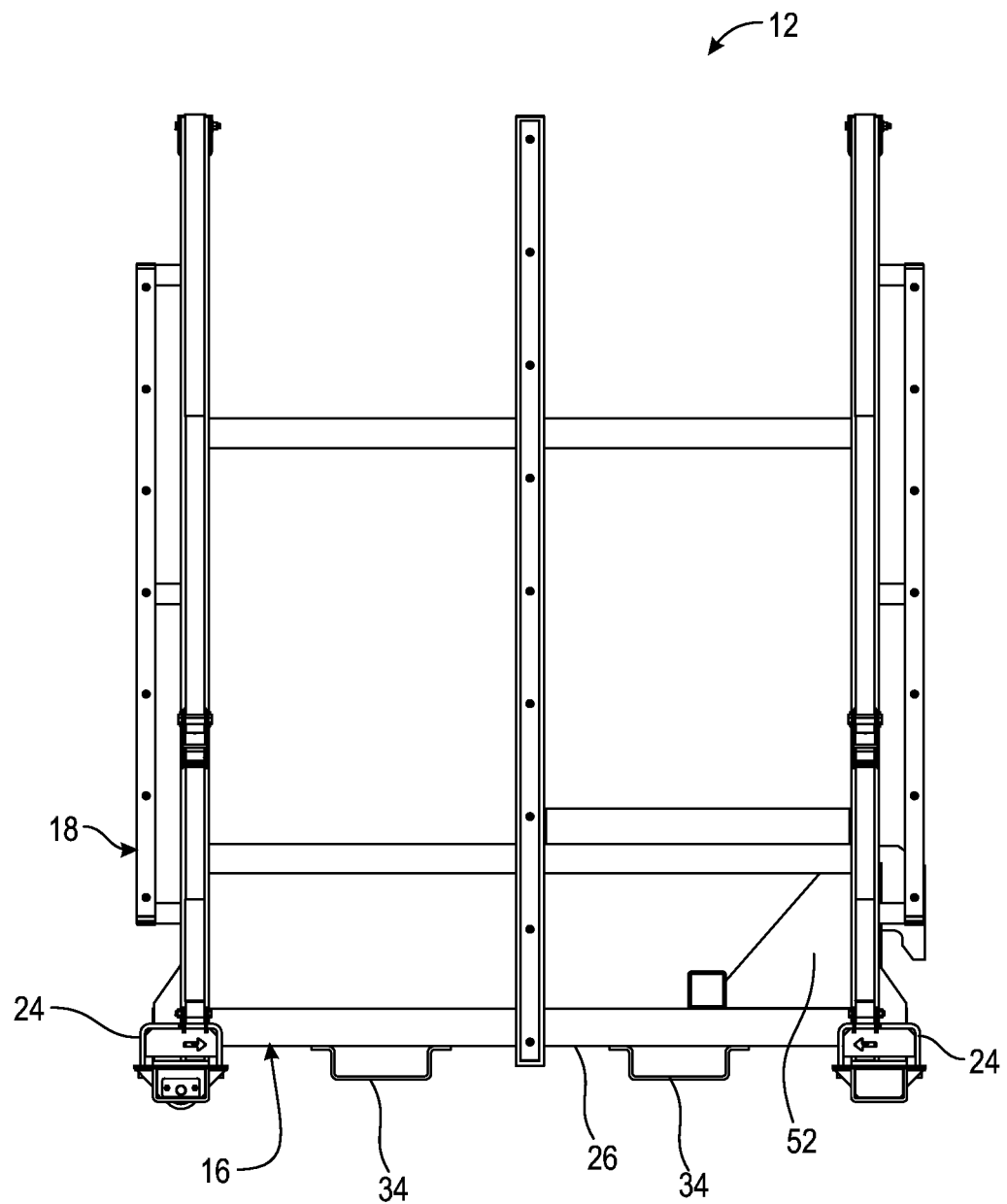
FIG. 3 is a left-side elevational view of the A-frame rack of FIGS. 1 and 2.
Figure 4:
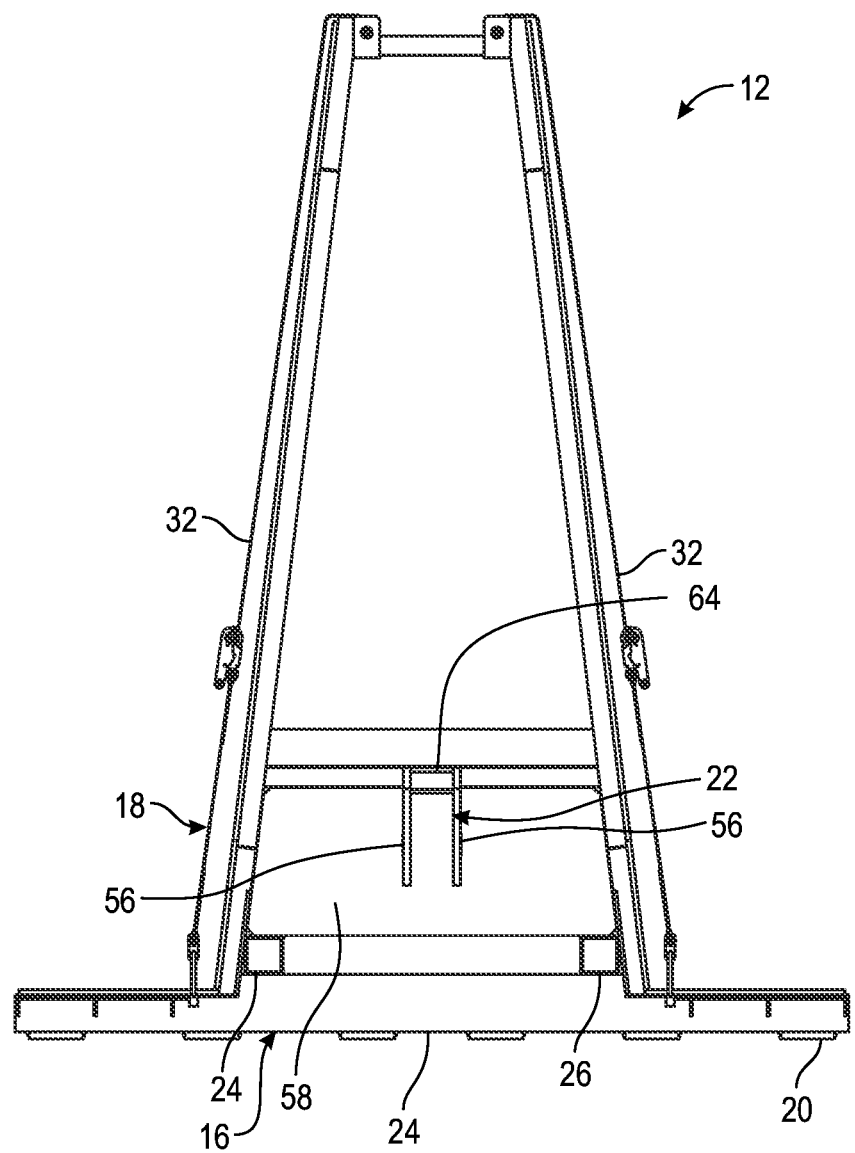
FIG. 4 is a rear elevational view of the A-frame rack of FIGS. 1 to 3.
Figure 5:
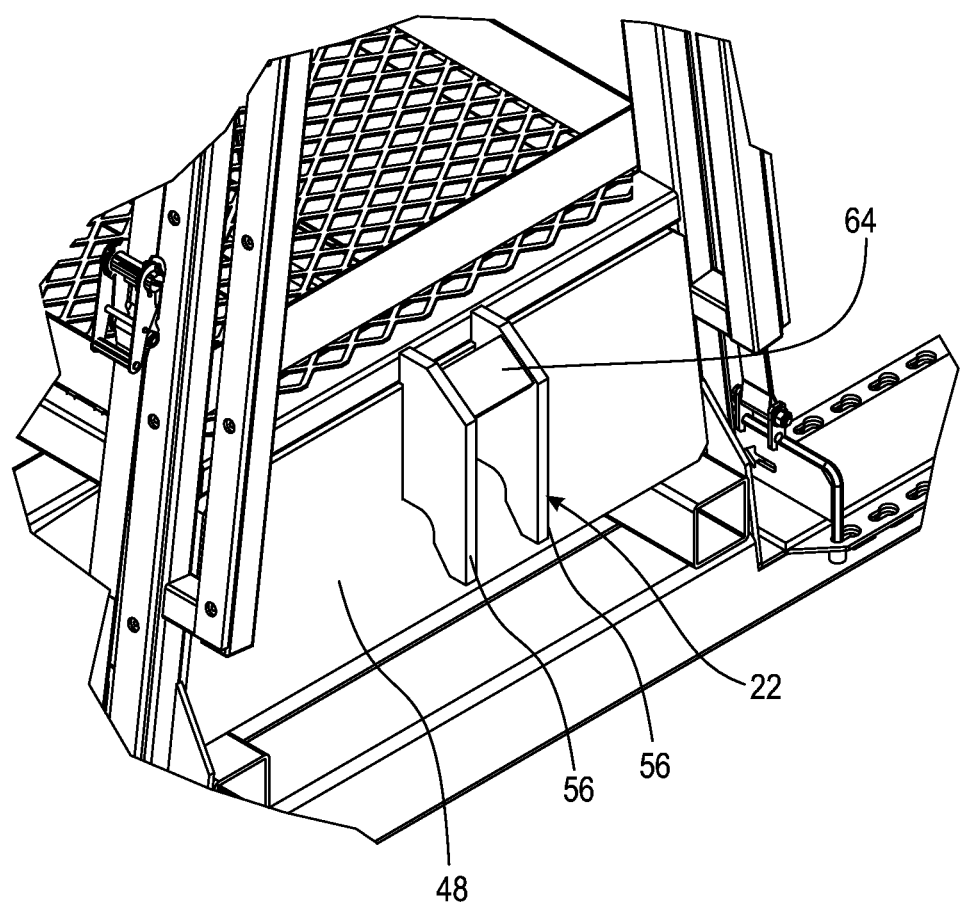
FIG. 5 is a fragmented and enlarged perspective view showing the A-frame rack of FIG. 1 in the area of a hitch bracket.
Figure 6:
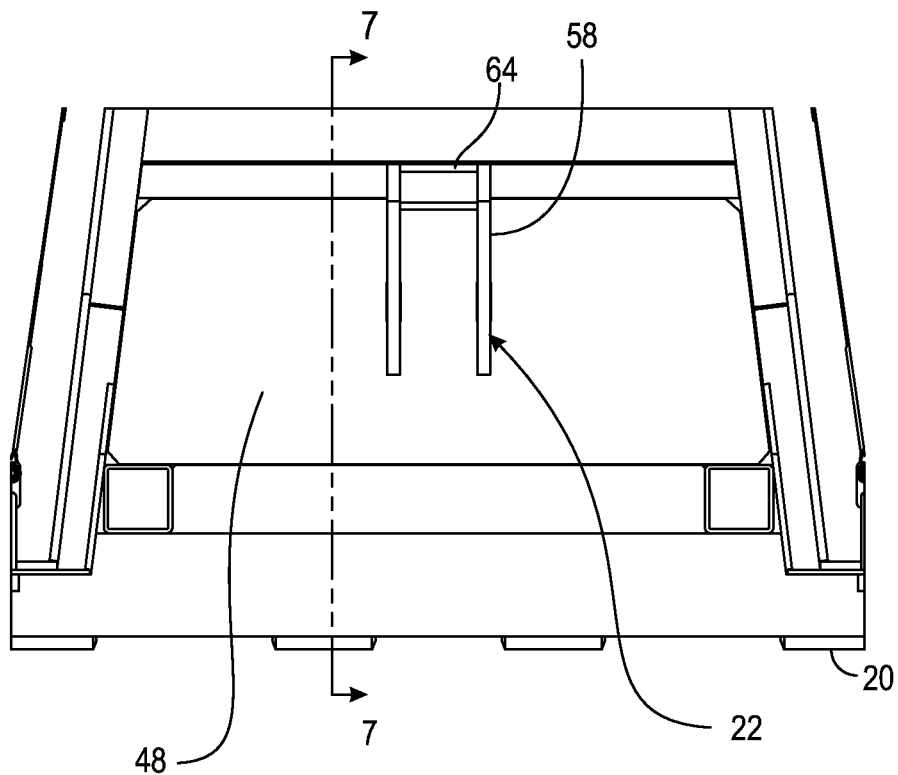
FIG. 6 is a fragmented and enlarged rear elevational view showing the A-frame rack of FIG. 4 in the area of a hitch bracket.
Figure 7:
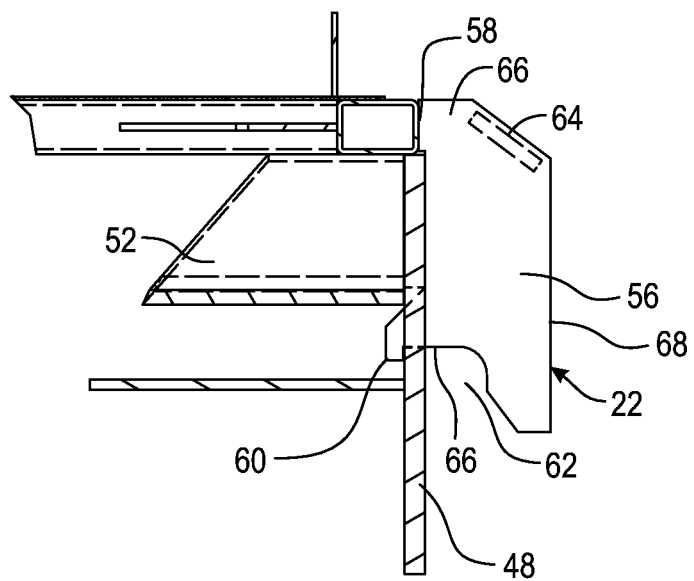
FIG. 7 is a cross sectional view taken from line 7-7 of FIG. 6.
Figure 8:
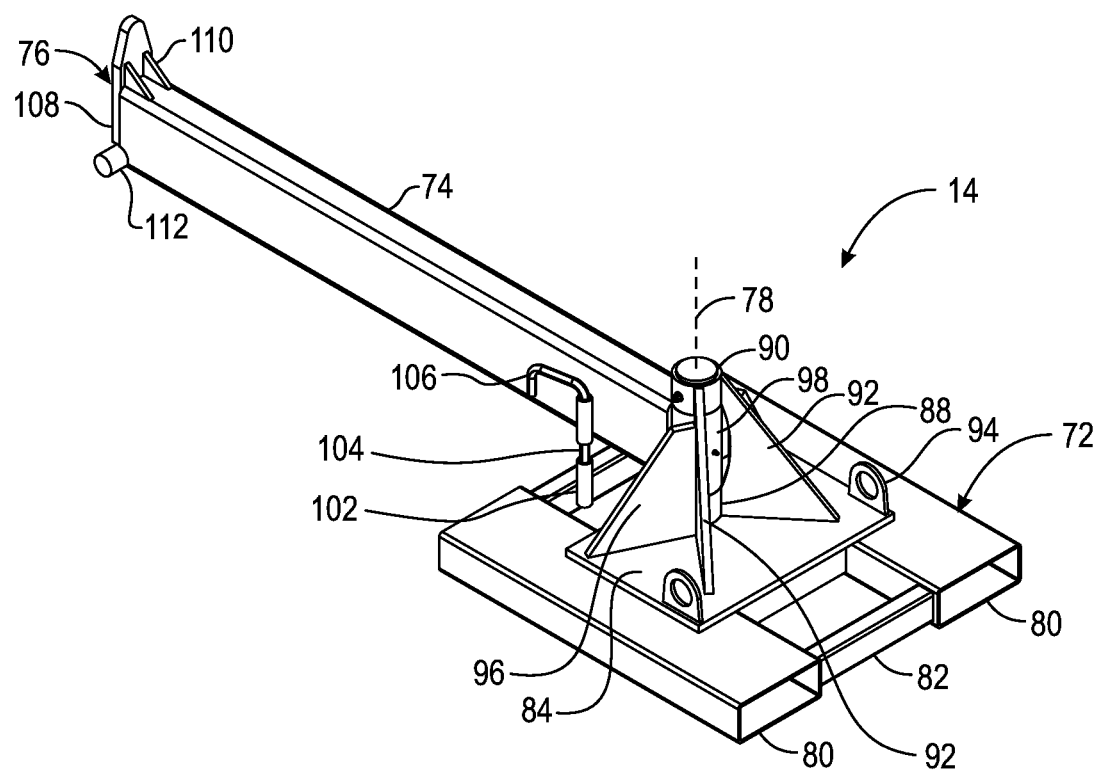
FIG. 8 is a perspective view of a hitch device according to the present invention which cooperates with the hitch bracket of the A-frame rack of FIGS. 1 to 7 for moving the A-frame rack with a forklift according to the present invention.
Figure 9:
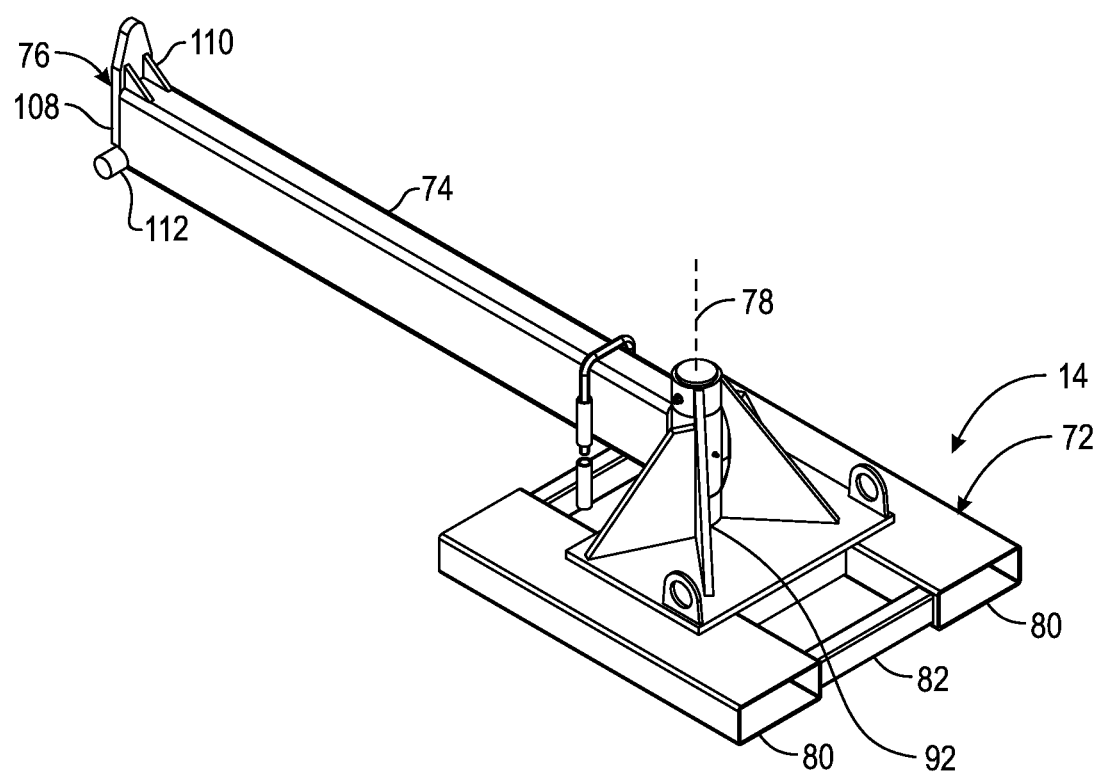
FIG. 9 is a perspective view of the hitch device of FIG. 8 but unlocked.
Figure 10:
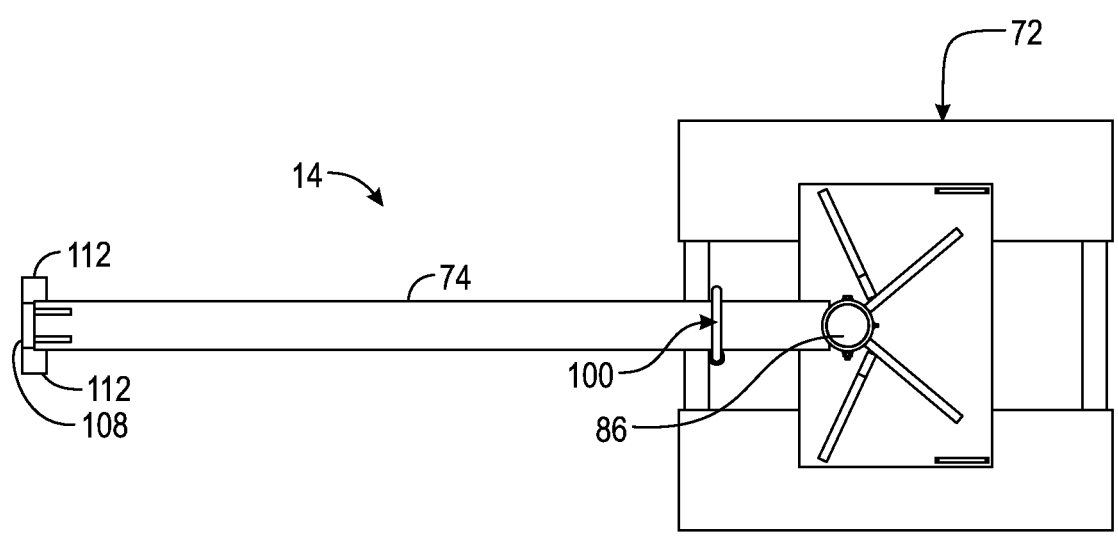
FIG. 10 is a top plan view of the hitch device of FIGS. 8 and 9.
Figure 11:
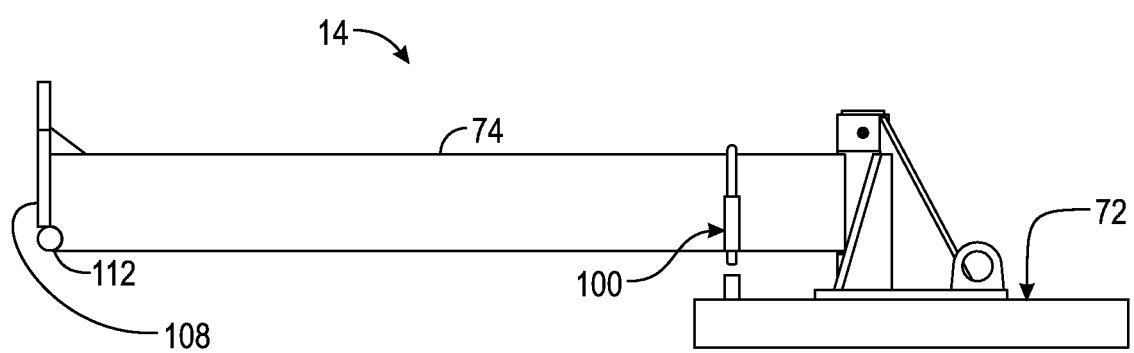
FIG. 11 is a left-side elevational view of the hitch device of FIGS. 8 to 10.

It should be understood that the appended drawings are not necessarily to scale, presenting a somewhat simplified representation of various preferred features illustrative of the basic principles of the invention. The specific design features of the rack systems as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the rack systems illustrated in the drawings. In general, up or upward generally refers to an upward direction within the plane of the paper in FIG. 2 and down or downward generally refers to a downward direction within the plane of the paper in FIG. 2. Also in general, fore or forward generally refers to an outward direction out the plane of the paper in FIG. 2 and aft or rearward generally refers to an inward direction into the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the rack systems, devices, and methods disclosed herein. The following detailed discussion of various alternative and preferred embodiments will illustrate the general principles of the invention with regard to the specific application of A-frame racks configured for supporting and transporting glass sheets or plates. Other embodiments suitable for other applications will be apparent to those skilled in the art given the benefit of this disclosure such as, for example but not limited to, A-frame racks for supporting and transporting other types of sheet materials, and other types of racks for supporting and transporting other types of materials.

FIGS. 1 to 14 illustrate a rack system 10 for transporting glass sheets or plates 114 according to the present invention. The illustrated transportable rack system 10 is configured for transporting a plurality of glass sheets or plates 114 and is movable by a standard forklift having a pair of or forks blades that can be selectively raised and lowered. The illustrated rack system 10 includes a transportable rack or rack weldment 12 (FIGS. 1 to 7) configured for supporting transporting the plurality of glass sheets or plates 114 and a hitch device or hitch weldment 14 (FIGS. 8 to 15) which can be lifted and carried by a standard forklift to selectively engage and move the transportable rack 12.

As best seen in FIGS. 1 to 7, the illustrated transportable rack 12 is an A-frame rack that supports glass sheets or plates 114 up to 102"×144" in size for shipment. A stack or packet of the glass sheets or plates 114 can be supported on each lateral side of the transportable rack 12 in an inclined manner. The illustrated transportable rack 12 a has a length no greater than 84½ inches, a width no greater than 87 inches, and a height no greater than 106⅝ inches so that up to thirteen of the transportable racks 12 can be positioned on a standard semi-trailer as described in more detail hereinbelow. The illustrated transportable rack 12 includes a base 16 having a first or forward end and a second or rearward end, and an upright A-frame structure 18 mounted on the base 16. The first end of the transportable rack 12 is provided with at least one rolling device 20 such as, for example but not limited to, a wheel and preferably a plurality of rolling devices 20 such as, for example but not limited to, a plurality of wheels. The opposite or rear end of the transportable rack 12 is provided with a hitch bracket 22 that cooperates with the hitch device 14 as described in more detail hereinbelow. It is noted that the transportable rack 12 can alternatively have any other suitable configuration.

The base 16 includes first and second horizontal, spaced-apart, and laterally extending base members 24, and first and second horizontal and spaced apart support members 16.

The first and second support members 26 are secured to the top of the base members 24 to connect the first and second base members 24 together. Setting blocks 28 are attached to the top of the ends of each of the first and second base members 24 for resting glass sheets or plates 114 or other materials thereon. Each setting block 29 includes a top protective surface that does not damage the sheets during racking or transport. The protective layer can also help hold the sheets in place and reduces sliding during transport or rolling movement of the transportable rack 12. Strap brackets 30 are provided at the ends of each of the first and second base members 24. Straps 32 with ratcheting buckles extend from the buckle brackets 30 to the top of transportable rack 12 for holding the glass sheets or plates 114 on the transportable rack 12 during transport. The strap buckles are adjustable along the length of the base members 24 to account for the thickness of the stack of glass sheets or plates 114. The illustrated first and second base members 24 each has a plurality of laterally spaced-apart rolling devices or wheels 20 rotatably mounted in wheel wells at the bottom of the base members 24 for rolling movement of the transportable rack 12 in the forward/rearward directions. The illustrated base members 24 each have six of the wheels 20 but any other suitable quantity can be alternatively be utilized. The wheels 20 provide a means for rolling movement of the transportable rack 12. It is noted that the wheels 20 can be eliminated from the rear or second base member 24 if desired. If the wheels 20 are eliminated from the rear second base member 24, the second base member 24 may also include legs that contact a floor surface on which the transportable rack 12 sits to rest the transportable rack 12 upon. A pair of horizontal and laterally-extending fork-blade channels 34 are secured to the bottom of the support members 26 between the base members 24. The fork-blade channels 34 are sized and shaped to receive forklift blades for lifting the transportable rack 12. The structural components of the base 16 are preferably formed of a steel and welded together. However, it noted that any other suitable materials and connection means can alternatively be utilized. It is also noted that the base 16 can alternatively have any other suitable configuration.

The illustrated A-frame structure 18 includes a plurality of A-frame uprights 36: a first or forward A-frame upright 36a, a second or middle A-frame upright 36b, and a third or rear A-frame upright 36b. Each illustrated A-frame upright includes two vertically arranged legs 38, and a plurality of lateral supports 40 secured between the legs 38. The first A-frame upright 36a is mounted on and attached to the first base member 24 of the base 16. The third A-frame upright 36c is mounted on and attached to second base member 24 of the base 16. The second A-frame upright 36b is mounted on and attached to the support members 26 of the base 16 centrally between the first and third A-frame uprights 36a, 36c. A plurality of cross supports 42 connect the first A-frame upright 36a to the second A-frame upright 36b, and the second A-frame upright 36b to the third A-frame upright 36c. A central cross member 44 extends between the lower lateral supports 40 of the first and third A-frame uprights 36a, 36c. A tray or shelf 46 with a mesh bottom is secured to the top of the lower cross supports 42 and the central cross member 44 between the second and third A-frame uprights 36b, 36c. The structural components of the A-frame structure 18 are preferably formed of a steel and welded together. However, it noted that any other suitable materials and connection means can alternatively be utilized. It is also noted that the A-Frame structure 18 can alternatively have any other suitable configuration.

A vertically-extending and rearward-facing planar mounting plate 48 secured to the third A-frame upright 36c and the between the lower lateral support 40 of the third A-frame upright 36c and the first and second support members 26 of the base 16. A horizontal and laterally extending top support member 50 is secured to the top of the first and second support members 26 and spaced apart from the mounting plate 48 in the forward direction. Opposed first and second planar braces 52 extend in an upward and inward inclined manner between and secured to the first and second support members 26 of the base 16 and the central cross member 44 of the A-frame structure 18. The first and second braces 52 also extend between and secured to the mounting plate 48 and support member 50. A third planar brace 54 horizontally extends between and is secured to the first and second braces 52 to form an "A" shape when rearwardly viewed from the front of the transportable rack 12 (best shown in FIG. 2) The third brace 54 is also preferably secured to the mounting plate 48.

The illustrated hitch bracket 22 includes left and right vertically-extending and laterally-facing side plates 56 spaced-apart in the lateral direction. Forward edges of the side plates 56 are secured to the mounting place 48 secured to the rear end of the transportable rack 12. The top of each forward edge is provided with a hook 58 for downwardly engaging the top edge of the mounting plate 48. The bottom of each of the forward edges is provided with a leg 60 that extends through an opening in the mounting plate 48 to form an interlock therebetween in the forward-rearward direction. A slot 62 upwardly extends from the bottom edge of each side plate 56 and is forwardly spaced from the rear edges of the side plates 56. A bottom portion of each slot 62 expands in the downward and rearward direction. A top rearward portion of each slot 62 is radiused or rounded to conform with the engagement member 76 as described in more detail herein below. A top plate 64 laterally extends between the side plates 56 near the rear edge in the side plates 56 and spaced from the forward edges of the side plates 56. The top plate 64 is tilted at an angle of about 45 degrees from horizontal so that its height increases in the forward direction. Formed in this manner, a vertically-extending passage extends from a bottom opening 66 between the side plates 56 and between the rear and front edges of the side plates 56 to a top opening 68 forward of the top plate 64 between the side plates 56 and between the front edge of the side plates and the front edge of the top plate 64. There is also a rear opening 70 at the rear edge of the side plates 56 between the side plates 56 and below the top plate 64.

As best shown in FIGS. 8 to 14, the illustrated hitch device 14 includes a body 72 configured to be carried by the blades of the forklift, an arm 74 having a first or attached end and a second or fee end, and an engagement member 76 at the second end of the arm 74. The first end of the arm 74 is pivotably secured to the body 72 in a cantilevered manner for pivoting movement of the arm 74 relative to the body 72 about a vertical axis 78. Thus the arm 74 remains horizontal as it pivots about the vertical axis 78 and the engagement member 76 is at the free end of the arm 74. It is noted that the hitch device 14 can alternatively have any other suitable configuration.

The illustrated body 72 includes a pair of horizontal and laterally spaced-apart channels 80 having open configured and sized for receiving the blades of the forklift therein. The channels 80 extend in the forward-reward direction and has an interior passage open at the forward and rearward ends for insertion of the forklift blades into the rearward ends. A plurality of horizontal square-tubes or supports 82 laterally extend between and connect the channels 80. A planar sheet is secured centrally on top and extending between the channels 80 to form a top platform 84. A vertically extending rod 86 extends from a top central location on top of the platform 84. The rod 86 forms a vertical axle 86 for the arm 74 as described in more detail hereinafter. A tubular base 88 is provided about the lower end of the axle 86 to provide a bottom support for the arm and a removable cap 90 is provided at the top of the axle 86 to provide a top support for the arm 74 to prevent inadvertent removal of the arm 74 from the axle 86. Rearwardly and outwardly extending triangular-shaped plates or braces 92 are secured to the top of the platform 84 and engage the tubular base 88 and the cap 90 to support the axle 86. A pair of laterally spaced-apart lifting lugs 94 are secured to the top of the platform 84 at the rear of the platform to aid in lifting the hitch device 14 when not in use. Forwardly and outwardly extending triangular-shaped plates or abutments 96 are secured to the top of the platform 84 and the supports to limit the pivoting motion of the arm 74 relative to the body 72 to between the abutments. The illustrated abutments 96 limit pivoting motion of the arm 74 relative to the body to about 130 degrees centered about the forward direction but any other suitable amount can alternatively be utilized. The structural components of the body 72 are preferably formed of a steel and welded together. However, it noted that any other suitable materials and connection means can alternatively be utilized. It is also noted that the body 72 can alternatively have any other suitable configuration.

The illustrated arm 74 is a horizontally-extending beam having a rectangular-shaped cross-section. A vertically-extending tube 98 is secured to the first or attachment end. The tube 98 is sized and shaped to receive the axle 86 therethrough for pivoting motion of the arm 74 about the axle 86. The components of the arm 74 are preferably formed of a steel and welded together. However, it noted that any other suitable materials and connection means can alternatively be utilized. It is also noted that the arm 74 can alternatively have any other suitable configuration.

The illustrated hitch device 14 is also provided with a lock 100 which when secured prevents pivoting motion of the arm 74 in a leftward direction when the arm 74 is in a straight forward position and when unsecured permits pivoting motion in both leftward and rightward direction when the arm 74 is in a straight forward position. The illustrated lock 100 prevents inadvertent pivoting of the arm 74 when the forklift is traveling along a generally straight path such as along a factory floor. The illustrated lock 100 includes a base member 102 and a blocking member 104 selectively securable to the base member 102. The illustrated base member 102 is a vertically extending tube secured to the forward most horizontal square tube or support 82 of the body 72 below and slightly to the left of the arm 74. The illustrated blocking member 104 includes a rod sized such that the lower end of the rod closely fits within the top opening of the tube forming the base member 102. The blocking member 104 also includes a tube secured to the rod at a position along the rod that is spaced from the lower end of the rod in order to form an abutment that limits insertion of the rod of the blocking member 104 into the base member 102. The upper end of the illustrated rod is bent to form a hook 106 sized and shaped to hang the blocking member 104 over the arm 74 without engaging the base member 102. Thus the blocking member 104 can be selectively moved between a locked position wherein the lower end of the blocking member 104 is inserted into the base member 102 (best shown in FIG. 8) and an unlocked position wherein the upper end of the blocking member 104 is hooked over the arm 74 (best shown in FIG. 9). It is noted that the lock 100 can alternatively be configured to selectively prevent pivoting motion in a rightward direction when the arm 74 is in a straight forward position, or to prevent pivoting motion in both directions when the arm 74 is in a straight forward position. It is also noted that the lock 100 can alternatively be any other suitable type of lock.

The illustrated engagement member 76 includes an elongate vertically-extending engagement plate 108 having a narrowing upper portion with a rounded upper end (best shown in FIGS. 13 and 14). The engagement plate 108 is sized and shaped to move upwardly through the passage in the hitch bracket 22. The engagement plate 108 is secured to the first or free end of the arm. The illustrated engagement plate 108 is provided with a triangular-shaped support or brace 110 secured to the top side of the arm 74 and the rear side of the engagement plate 108. The engagement plate 108 is sized and shaped to cooperate with the hitch bracket 22 as described in more detail hereinafter. The illustrated engagement member 76 also includes a pair of opposed horizontal and laterally-extending pins 112 secured to the front end of the arm 74 below the engagement plate 108. The pins 112 extend laterally outward beyond the lateral sides of the arm 74 and the engagement plate 108. The pins 108 are sized and shaped to move upwardly into the slots 62 of hitch bracket 22 and engage the top of the slots 62 of hitch bracket 22. The illustrated pins 112 are formed by a single round bar but can alternatively be formed as separate components. The components of the engagement member 76 are preferably formed of a steel and welded together. However, it noted that any other suitable materials and connection means can alternatively be utilized. It is also noted that the engagement member 76 can alternatively have any other suitable configuration.

The illustrated engagement member 76 and the illustrated hitch bracket 22 are configured so that upward movement of the forklift blades raises the engagement member 76 into engagement with the hitch bracket 22 with the engagement plate 108 extending upward in the vertical passage of the hitch bracket 22 and forward of the top plate 64 of the hitch bracket 22, the pins 112 within and engaging the top of the slots 62 of the hitch bracket 22, and the arm 74 extending through the rear opening 70 of the hitch bracket 22 so that further upward movement of the forklift blades raises at least the second end of the transportable rack 12 so that horizontal movement of the forklift rolls the transportable rack 10 on the at least one wheel 20. Alternatively, the entire transportable rack 10 can be entirely raised and carried by the forklift. It is noted that the tops of the illustrated slots 62 have a radius or curvature that closely matches the diameter of the pins 112 to increase contact area therebetween.

Figure 15:
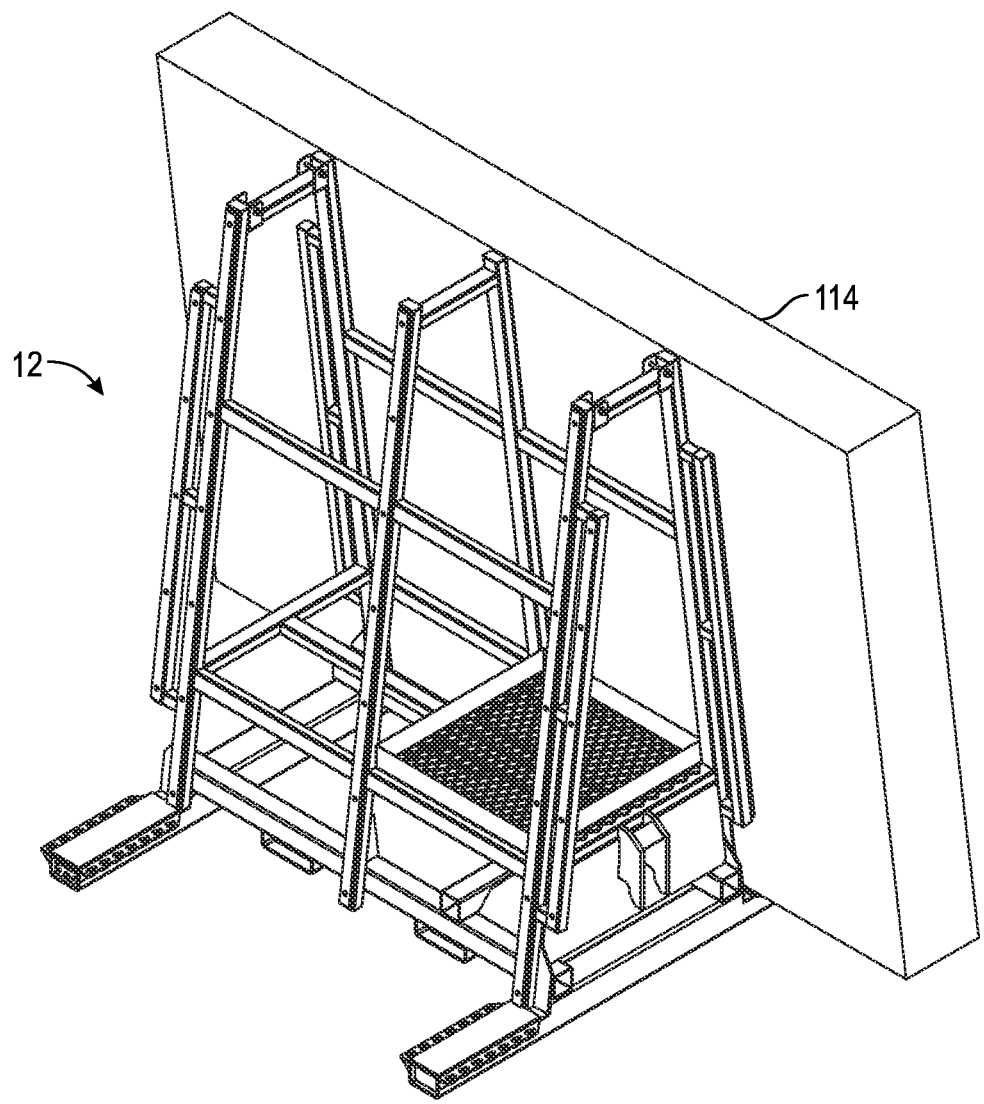
FIG. 15 is a perspective view of the A-frame rack of FIGS. 1 to 7 supporting a pack of glass sheets.
Figure 16:
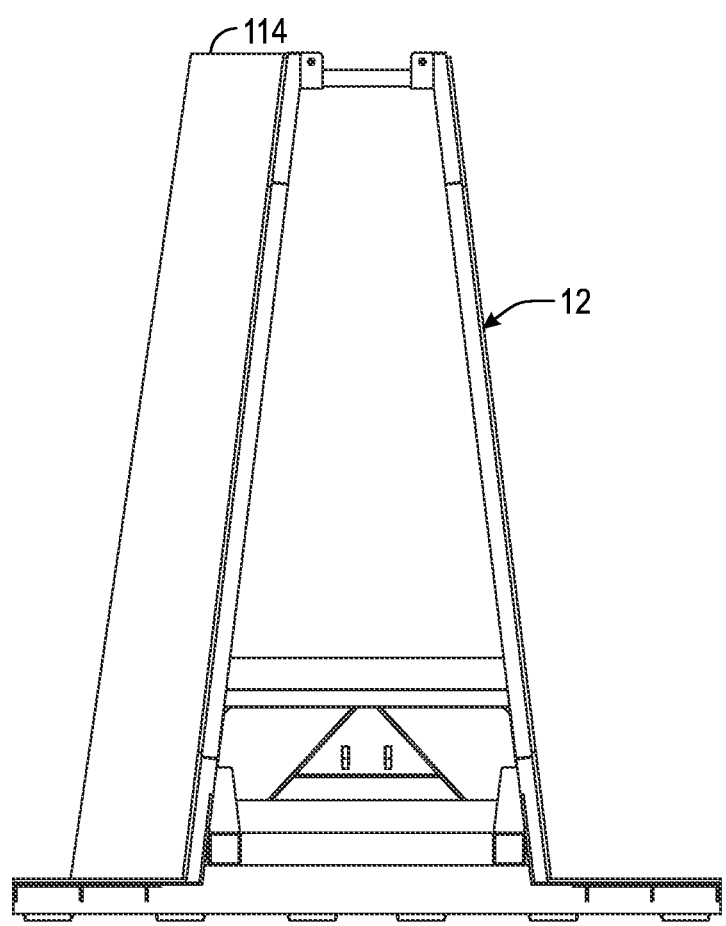
FIG. 16 is a front elevational view of the A-frame rack supporting the pack of glass sheets of FIG. 15.
Figure 17:
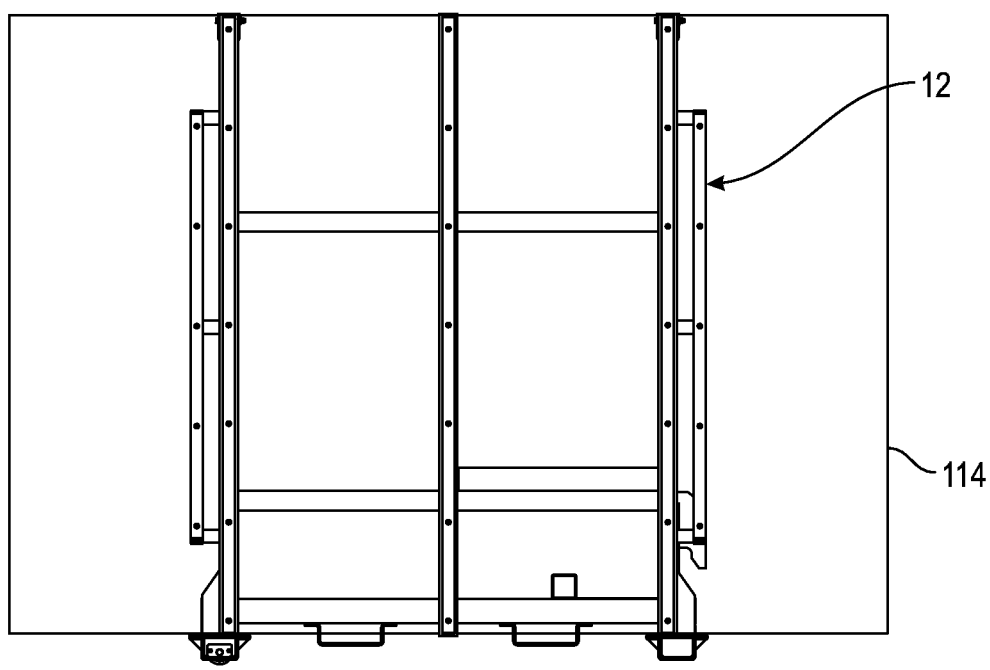
FIG. 17 is a left-side elevational view of the A-frame rack supporting the pack of glass sheets of FIGS. 15 and 16.

FIGS. 15 to 17 show the illustrated transportable rack 12 loaded with a pack of glass sheets or plates 114 on one side. The illustrated pack size is 102 inches tall, 144 inches wide, and 15 inches deep. Thus, the loaded transportable rack 102 has a height of 106⅝ inches, a length of 144 inches, and a width of 87 inches. For a glass shipment with two of the loaded transportable racks 12, which weigh up to 10 k pounds each when loaded with the glass sheets or plates 114, are rolled lengthwise onto and off of a standard semi-trailer 116 using the standard forklift. The hitch device 14 mates the transportable rack 12 with the forklift as described above. The forklift raises the attached rear end so that the loaded transportable rack 12 can be rolled on the at least one wheel 20 at the forward end of the transportable rack 12.

Figure 18:
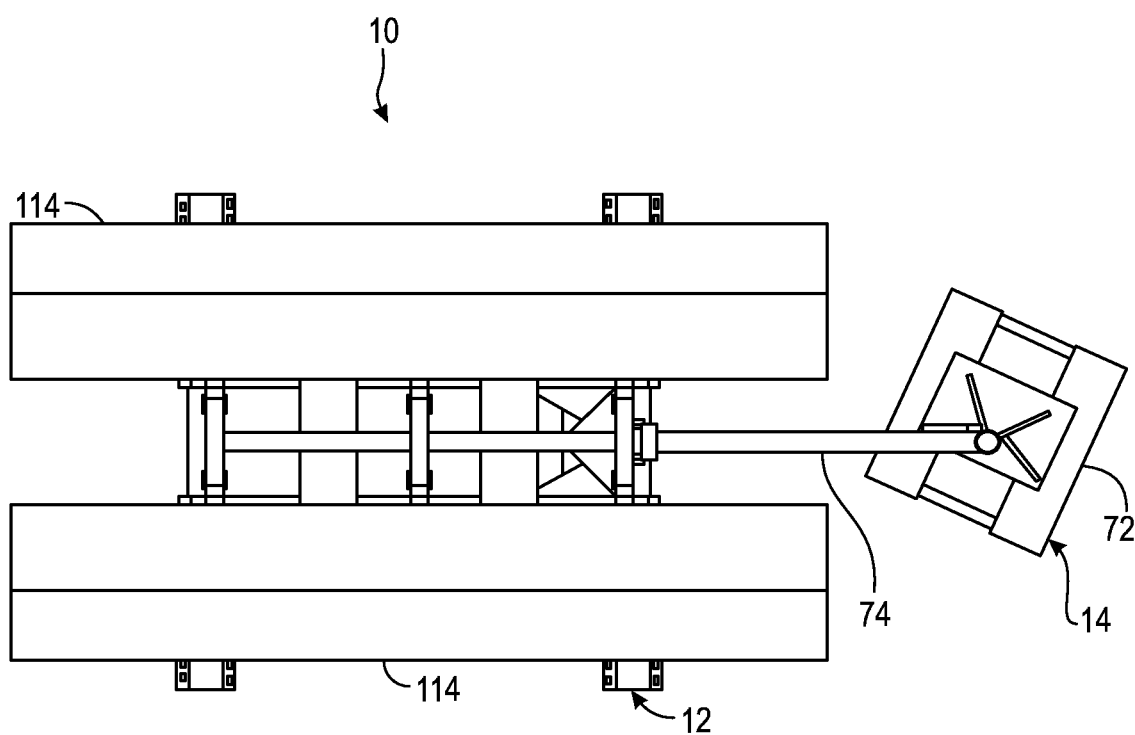
FIG. 18 is a top plan view showing the hitch device of FIGS. 8 to 12 engaged with the A-frame-rack of FIGS. 15 to 17.

In operation, the hitch device 14 is slid onto forks or blades of the standard forklift or fork truck and the engagement member 76 at the free end of the arm 74 of the hitch device 14 is engaged with the hitch bracket 22 on the rear end of the transportable rack 12. First the engagement member 76 is moved below the hitch bracket 22. Then the blades of the forklift are raised while the engagement member 76 is below the hitch bracket 22 until the engagement member 76 engages the hitch bracket 22 as described hereinabove. With the engagement member 76 engaging with the hitch bracket 22, the forklift can raise the attached rear end of the transportable rack 12 so that the transportable rack 12 is supported by the at least one rolling device 20 at the forward end of the transportable rack 12. The transportable rack 12 can then be selectively rolled on its at least one rolling device 20 by moving the standard forklift. As best shown in FIG. 18, the illustrated rack system 10 has a maximum turning radius of about 147 inches measured from the centerline of the hitch device 14 at the rear of the hitch device 14 while the arm 74 is fully pivoted against the abutment 96 and the at least one rolling device 20 of transportable rack 12 as shown. Thus, the illustrated rack systems 10 enable relatively sharp turns with use of the standard forklift.

Figure 19:
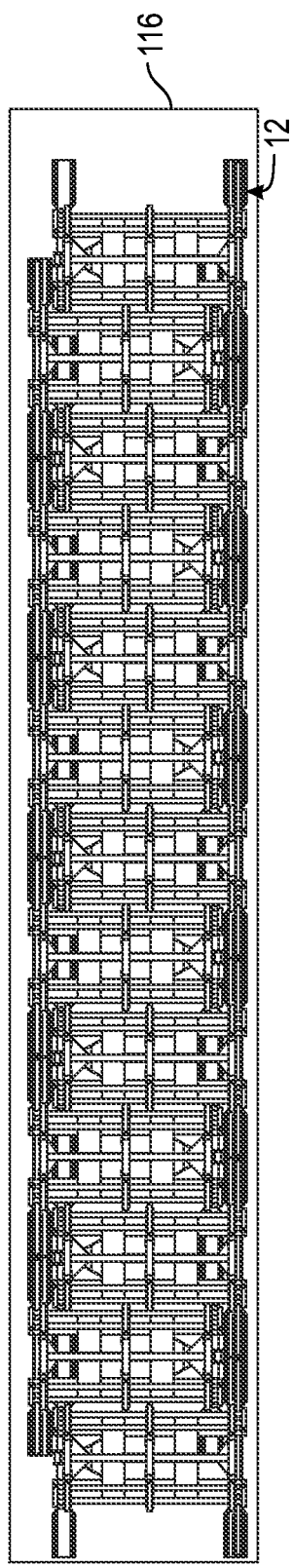
FIG. 19 is a top plan view of thirteen empty A-frame racks of FIGS. 1 to 7 positioned for a single return semi-trailer load.
Figure 20:
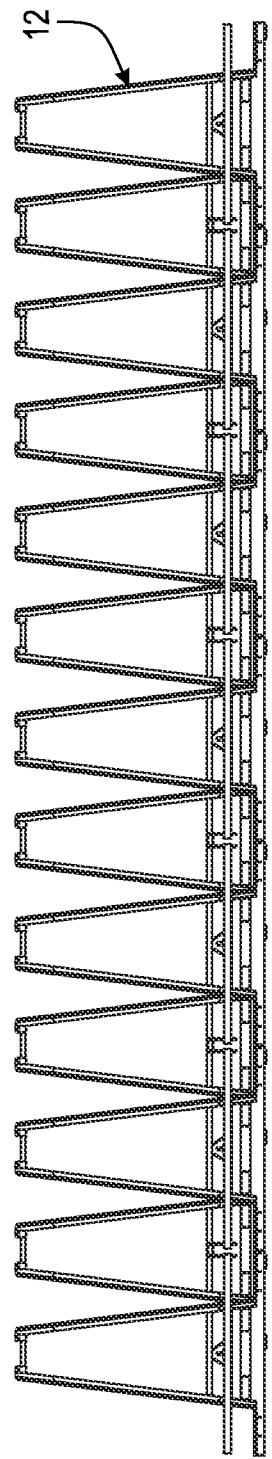
FIG. 20 is a left-side side elevational view of the thirteen empty A-frame racks of FIG. 19.

As best shown in FIGS. 19 and 20, for a return trip, up to thirteen of the empty transportable racks 12 can be loaded onto the standard-sized semi-truck trailer 116 with the empty transportable racks 12 oriented latterally. That is, with the ends of the transportable racks 12 facing the sides of the standard sized semi-truck trailer 116. With the hitch device 14 removed, the transportable racks 12 are placed side-by-side and staggered so that they nest together. Thirteen of the transportable racks 12 positioned and nested together in this manner have the overall size of a length of 612 inches, a width of 95½ inches, and height of 106⅝ inches Thus the thirteen transportable racks 12 fit on a standard-sized 53 foot long semi-truck trailer 116 that has the dimensions of a length of about 630 inches, a width of about 102 inches, and a height of about 162 inches. The empty transportable racks 12 are lifted one-by-one and moved onto and off of the standard-sized semi-trailer by a standard forklift by inserting the forks of the forklift into the laterally extending channels of the transportable rack 34 from the rear end of the trailer 116. Loaded in this manner, the number of required return trips can be reduced to return all of the empty transportable racks 12 once the glass sheets or plates 114 have been delivered.

It is noted that each of the features of the various disclosed embodiments of the present invention can be utilized in any combination with each of the other disclosed embodiments of the present invention.

From the above disclosure it can be appreciated that the rack system 10 according to the present invention enables an increased number of transportable racks 12 that hold large glass sheets or plates 114 (up to 102 inches by 144 inches) to be returned in a single return of a semi-trailer 116 without the need to reconfigure, fold, collapse etc. the transportable racks 12. It can also be appreciated that the hitch device 14 provides increased maneuverability of the transportable racks 12 when moved using a standard forklift.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A rack system movable by a forklift having a pair of blades that can be selectively raised and lowered, the rack system comprising, in combination:
a rack comprising:
a structure configured for supporting and transporting materials and having a first end and a second end opposite the first end;
at least one wheel located at the first end of the structure;
a vertically-extending mounting plate located at the second end of the structure; and
a hitch bracket located at the vertically-extending mounting plate; and
a hitch device comprising:
a body configured to be carried by the blades of the forklift;
an arm having a first end and a second end, wherein the first end of the arm is pivotably secured to the body for pivoting movement of the arm relative to the body about a vertical axis; and
an engagement member at the second end of the arm operable to engage the hitch bracket;
wherein the engagement member and the hitch bracket are configured so that when blades of the forklift carry the body, upward movement of the blades raises the engagement member into engagement with the hitch bracket so that further upward movement of the blades raises the second end of the rack and horizontal movement of the forklift rolls the rack on the at least one wheel.

2. The rack system according to claim 1, where in the rack is configured for transporting a plurality of glass sheets.

3. The rack system according to claim 2, wherein the rack is an A-frame rack.

4. The rack system according to claim 1, wherein the body carries abutments to limit pivoting motion of the arm relative to the body.

5. The rack system according to claim 1, wherein the engagement member extends upward from the arm, and the hitch bracket has a vertically-extending passage along a portion of the mounting plate, open at a lower end and sized and shaped for receiving the engagement member.

6. The rack system according to claim 5, wherein the arm carries a pair of opposed horizontal and laterally-extending pins at the second end of the arm and wherein the hitch bracket includes a pair of laterally spaced-apart side plates comprising slots open at lower ends for selectively receiving the opposed horizontal and laterally-extending pins, wherein the pair of laterally spaced-apart side plates define the vertically-extending passage there between.

7. The rack system according to claim 1, wherein the hitch device further comprises a lock configured to selectively prevent the arm from pivoting in at least one direction from a forward position.

8. The rack system according to claim 7, wherein the lock selectively prevents the arm from pivoting in only one direction from the forward position.

9. The rack system according to claim 7, wherein the lock comprises a base member secured to the body of the hitch device and a blocking member configured for partial insertion into the base member.

10. The rack system device according to claim 1, wherein the body includes a pair of horizontal and laterally spaced-apart channels configured for receiving the blades of the forklift.

* * * * *